US012264781B2

(12) United States Patent
Poland et al.

(10) Patent No.: US 12,264,781 B2
(45) **Date of Patent: *Apr. 1, 2025**

(54) TANK AND NOZZLE ASSEMBLY

(71) Applicant: WORTHINGTON CYLINDERS CORPORATION, Columbus, OH (US)

(72) Inventors: Brian Poland, Columbus, OH (US); Cliff Walters, Westerville, OH (US); Timothy Horn, Columbus, OH (US)

(73) Assignee: Worthington Cylinders Corporation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,599

(22) Filed: Jun. 13, 2023

(65) Prior Publication Data

US 2023/0332748 A1 Oct. 19, 2023

Related U.S. Application Data

(63) Continuation of application No. 17/719,872, filed on Apr. 13, 2022, now Pat. No. 11,713,850.

(51) Int. Cl.
*F17C 13/04* (2006.01)
*F17C 13/06* (2006.01)

(52) U.S. Cl.
CPC .............. *F17C 13/04* (2013.01); *F17C 13/06* (2013.01); *F17C 2201/0119* (2013.01); *F17C 2205/0308* (2013.01); *F17C 2205/0332* (2013.01); *F17C 2205/0338* (2013.01); *F17C 2205/0382* (2013.01); *F17C 2205/0394* (2013.01); *F17C 2221/017* (2013.01); *F17C 2260/021* (2013.01); *F17C 2270/0772* (2013.01)

(58) Field of Classification Search
CPC ......... B65D 83/46; B65D 83/50; F17C 13/04; F17C 2221/017; F17C 2205/0332; F17C 2205/0338; F17C 2205/0382; F17C 2205/0394
See application file for complete search history.

(56) References Cited

U.S. PATENT DOCUMENTS

| | | | |
|---|---|---|---|
| 8,132,564 | B2 | 3/2012 | Stone |
| 9,593,873 | B2 | 3/2017 | Lundberg |
| 10,597,221 | B2 | 3/2020 | Snyder |
| 2013/0284957 | A1 | 10/2013 | Tarczewski |
| 2021/0229897 | A1 | 7/2021 | Abels |

*Primary Examiner* — Paul J Gray
(74) *Attorney, Agent, or Firm* — TUCKER ELLIS LLP

(57) ABSTRACT

Provided is a nozzle assembly including a valve assembly configured to be coupled to a tank, the valve assembly including a valve body having a first end, a second end, and a first passage extending therebetween, and a valve disposed in the first passage, and a regulator assembly configured to be coupled to the valve assembly, the regulator assembly including a regulator body having a first end, a second end, and a second passage extending therebetween, a nozzle coupled to the regulator body and having an outlet in communication with the second passage, a spindle having a first end disposed in the second passage and a second end surrounded by the nozzle, and a piston assembly disposed in the second passage.

19 Claims, 17 Drawing Sheets

TANK AND NOZZLE ASSEMBLY

CROSS REFERENCE TO RELATED APPLICATIONS

This application is a continuation of U.S. patent application Ser. No. 17/719,872, filed Apr. 13, 2022, entitled "TANK AND NOZZLE ASSEMBLY," the disclosure of which is incorporated herein by reference in its entirety.

TECHNICAL FIELD

This application relates generally to devices used to fill balloons, and more particularly, to a tank with a regulator assembly.

BACKGROUND OF THE INVENTION

A pressure tank containing a pressurized gas, a shutoff valve, and a tilt valve can be used for filling balloons. The tank is used to store a gas under a pressure, and the tank, the shutoff valve, and the tilt valve are placed in fluid communication with one another. The gas passes from the tank, through the shut off valve, through the tilt valve, and into the balloon in an effort to establish pressure equilibrium.

The pressure tank and the shutoff valve can be of unitary construction. The shutoff valve generally provides a measure of safety that ensures that the pressurized gas inside the tank does not leak out unwantedly or is not dispensed inadvertently or accidentally. For example, the shut off valve is typically closed to prevent the loss of gas when the device is being stored or transported or when the device is not being used to fill balloons.

The tilt valve is placed in fluid communication with the shutoff valve by threading the tilt valve onto a mating threaded outlet port of the shutoff valve, the shutoff valve and the tilt valve having corresponding male and female threads, respectively. To fill a balloon, a consumer opens the shutoff valve, slides the neck of the balloon over the end of the tilt valve and presses against the side of the tilt valve, opening the tilt valve, transferring a portion of the pressurized gas stored in the pressure tank into the balloon to expand the balloon.

SUMMARY OF THE INVENTION

In accordance with an embodiment of the present invention, a nozzle assembly is provided that includes a valve assembly configured to be coupled to a tank, the valve assembly including a valve body having a first end, a second end, and a first passage extending therebetween, and a valve disposed in the first passage, and a regulator assembly configured to be coupled to the valve assembly, the regulator assembly including a regulator body having a first end, a second end, and a second passage extending therebetween, a nozzle coupled to the regulator body and having an outlet in communication with the second passage, a spindle having a first end disposed in the second passage and a second end surrounded by the nozzle, and a piston assembly disposed in the second passage.

In accordance with another embodiment of the present invention, a tank assembly is provided that includes a tank having a body with a neck, and a nozzle assembly configured to be coupled to the tank, the nozzle assembly including a valve assembly including a valve body having a first end, a second end, and a first passage extending therebetween, and a valve disposed in the first passage, and a regulator assembly configured to be coupled to the valve assembly, the regulator assembly including a regulator body having a first end, a second end, and a second passage extending therebetween, a nozzle coupled to the regulator body and having an outlet in communication with the second passage, a spindle having a first end disposed in the second passage and a second end surrounded by the nozzle, and a piston assembly disposed in the second passage.

In accordance with still another embodiment of the present invention, a method of assembly a tank assembly a tank and a nozzle assembly having a valve assembly and a regulator assembly, the method including coupling the valve assembly to the tank by engaging threads on an outer surface of the valve assembly with the threads on the inner surface of a neck of the tank, filling the tank with a pressurized fluid through a valve of the valve assembly, and attaching the regulator assembly to the valve assembly by non-removably engaging threads on the regulator assembly with threads on the valve assembly.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
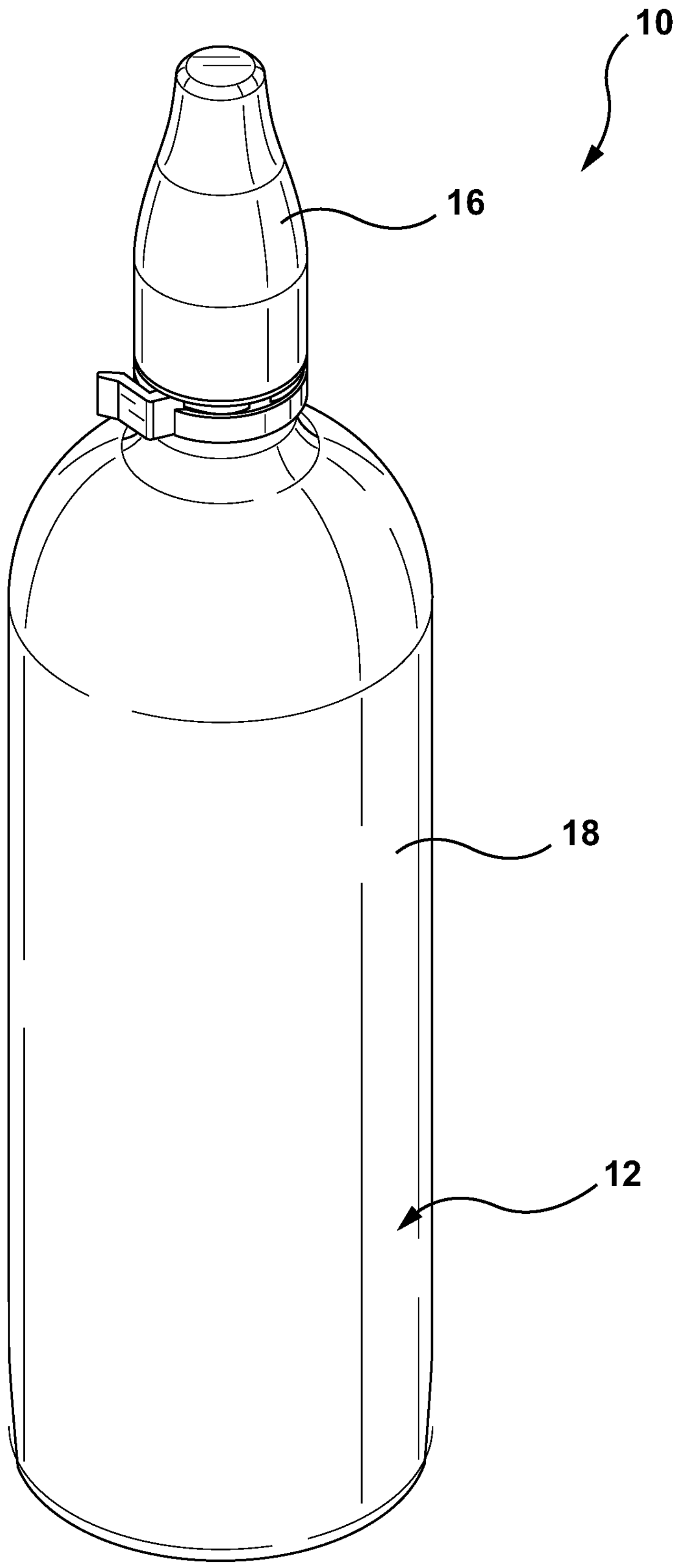
FIG. 1 is a perspective view of an exemplary tank assembly.
Figure 2:
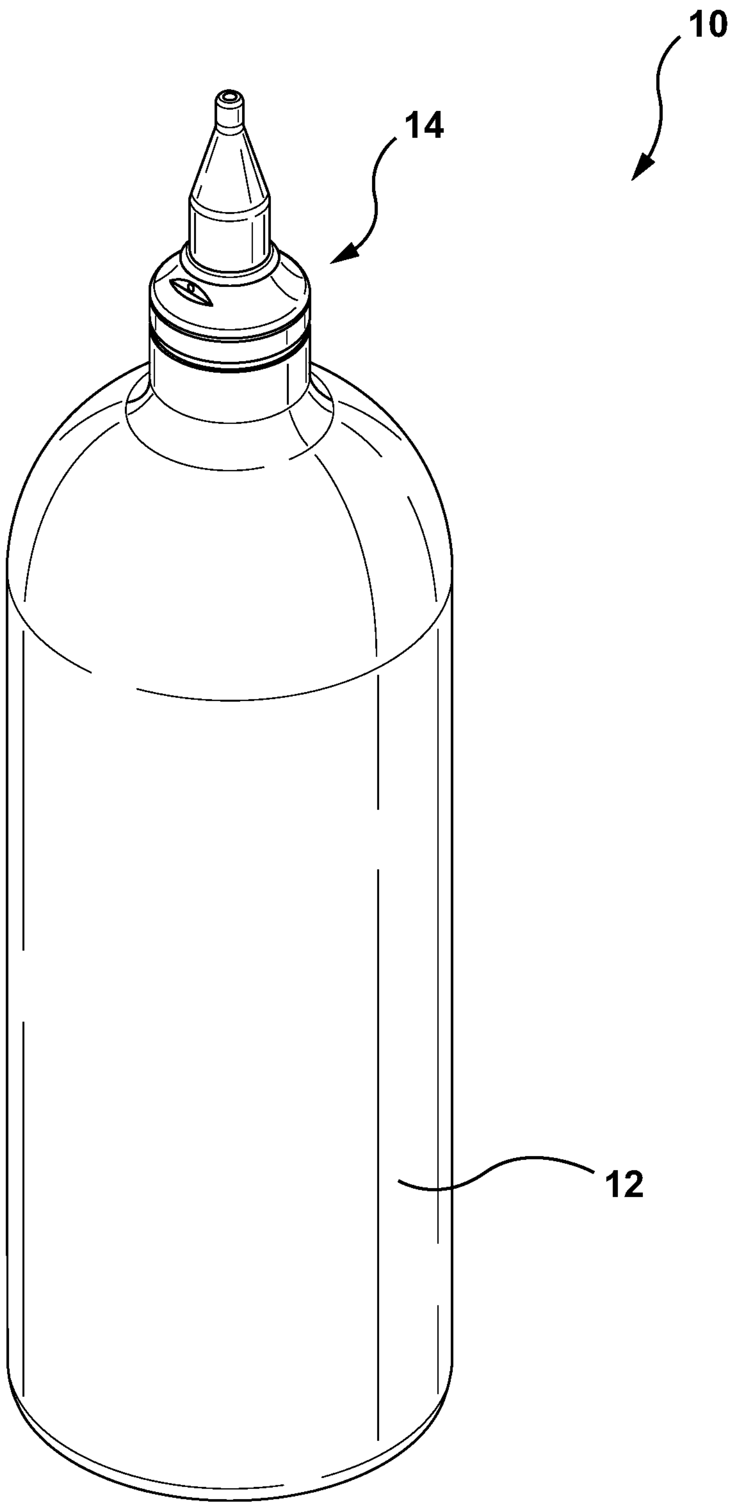
FIG. 2 is another perspective view of the tank assembly.
Figure 3:
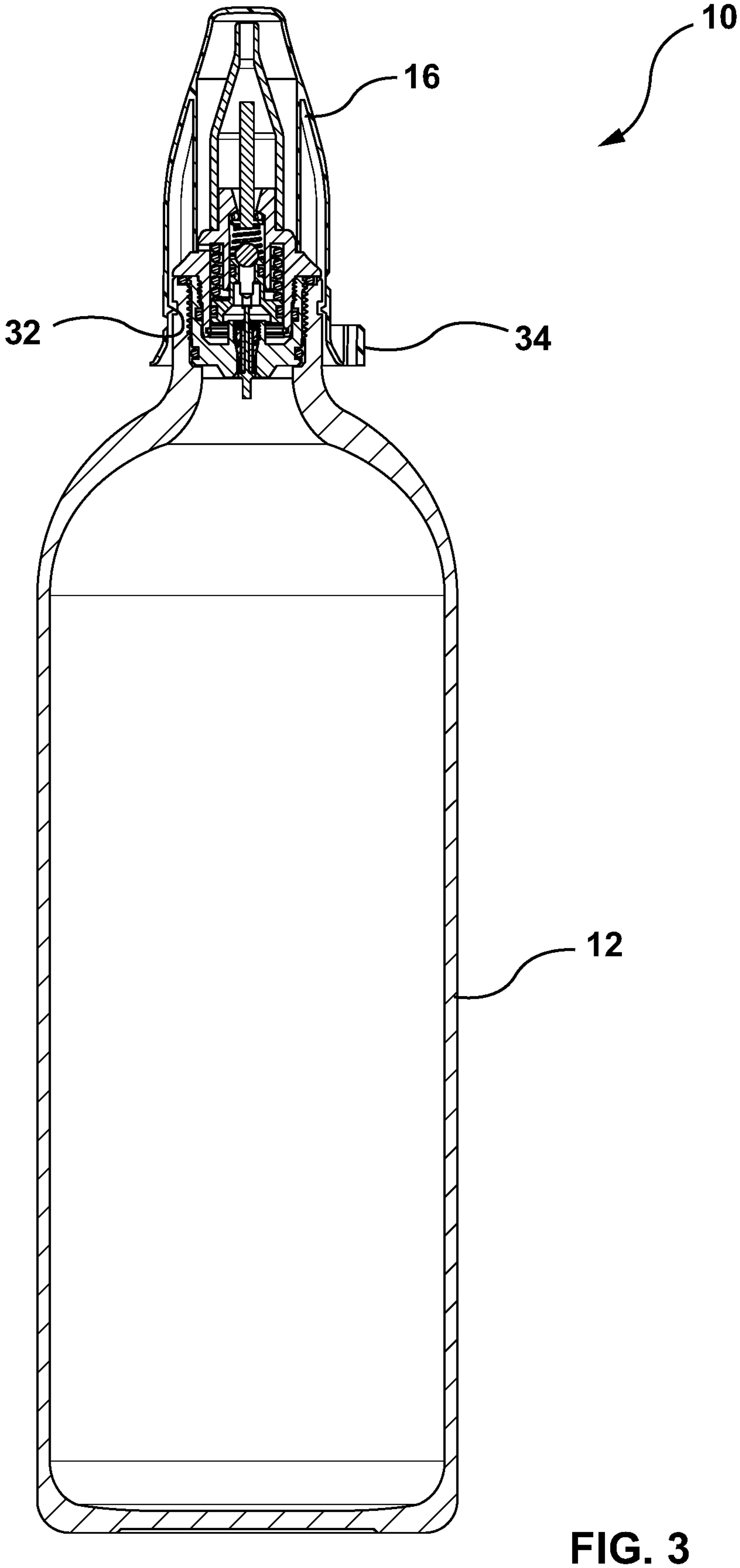
FIG. 3 is a cross-sectional view of the tank assembly.
Figure 4:
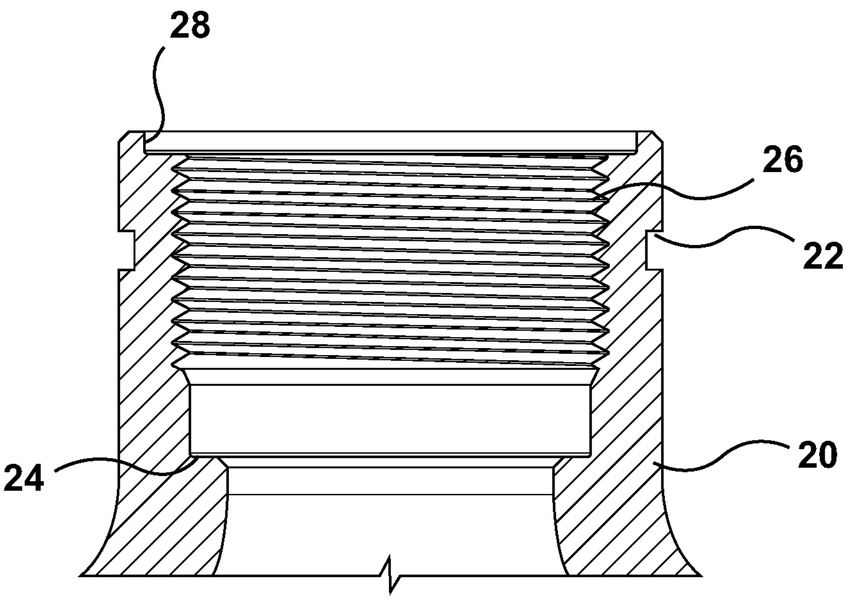
FIG. 4 is a partial cross-sectional view of a tank of the tank assembly.

Embodiments of the invention relate to methods and systems that relate to a tank assembly including a tank having a body with a neck, and a nozzle assembly configured to be coupled to the tank. The nozzle assembly includes a valve assembly including a valve body having a first end, a second end, and a first passage extending therebetween, and a valve disposed in the first passage, and a regulator assembly configured to be coupled to the valve assembly, the regulator assembly including a regulator body having a first end, a second end, and a second passage extending therebetween, a nozzle coupled to the regulator body and having an outlet in communication with the second passage, a spindle having a first end disposed in the second passage and a second end surrounded by the nozzle, and a piston assembly disposed in the second passage.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning initially to FIGS. 1-4, a tank assembly is shown at reference numeral 10. The tank assembly 10 includes a tank 12, a nozzle assembly 14 coupled to the tank 12, and a cap 16 coupled to the tank 12. The tank 12 may be made of any suitable material, such as steel, and may be suitably sized, as desired, to change the filling capacity, i.e., quantity and/or size. The tank 12 generally contains pressurized helium, for example for use in filling balloons, but may contain a mixture of helium and air having a suitable pressure, such as greater than about 1700 psi. The tank 12 has a body 18 with a neck 20 having an outer locking channel 22, a first inner annular ledge 24 defining a first sealing surface, threads 26 for mating with the nozzle assembly 14, and a second inner annular ledge 28 a top thereof defining a second sealing surface.

Figure 5:
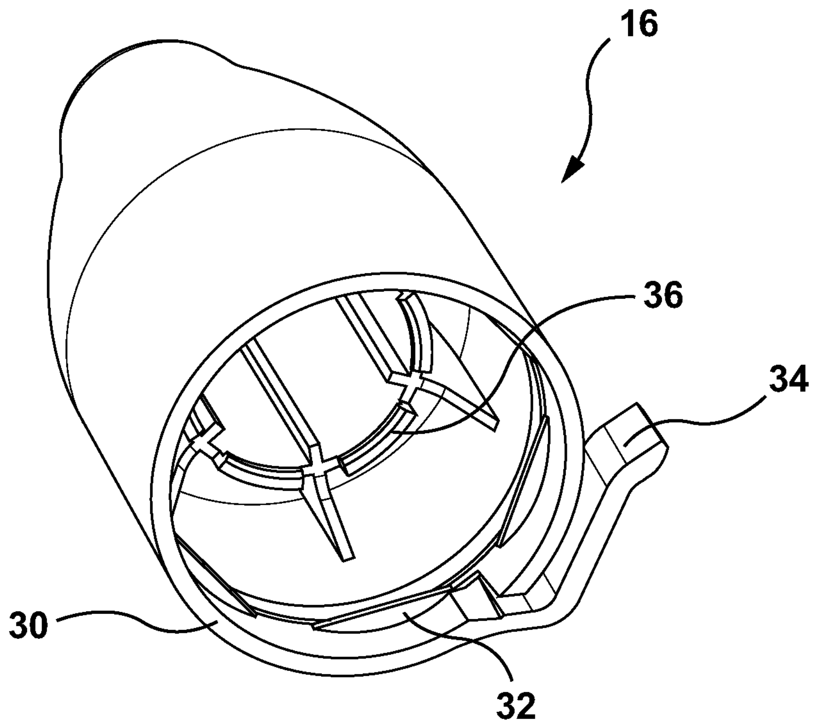
FIG. 5 is a perspective view of a cap.
Figure 6:
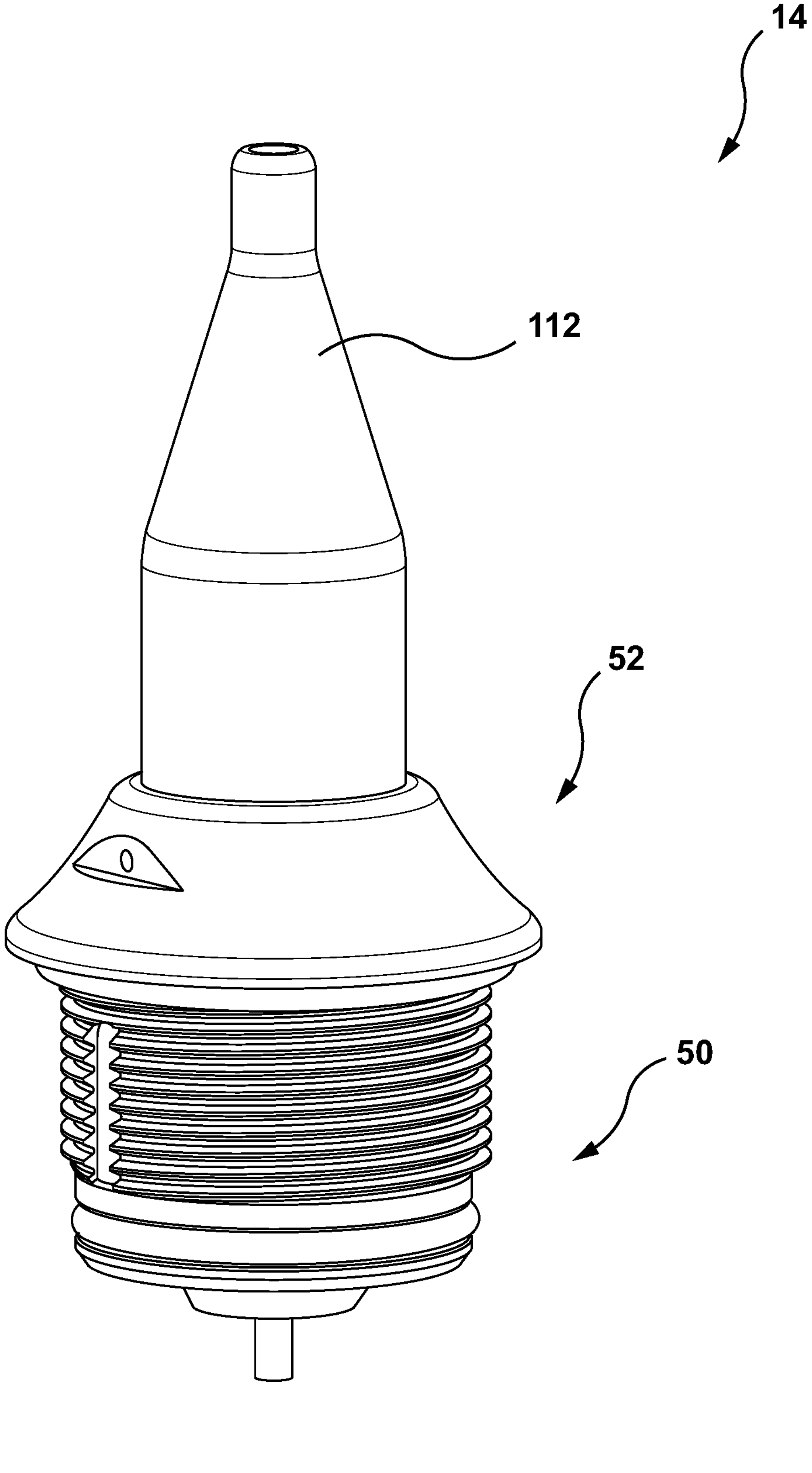
FIG. 6 is a perspective view of a nozzle assembly.
Figure 7:
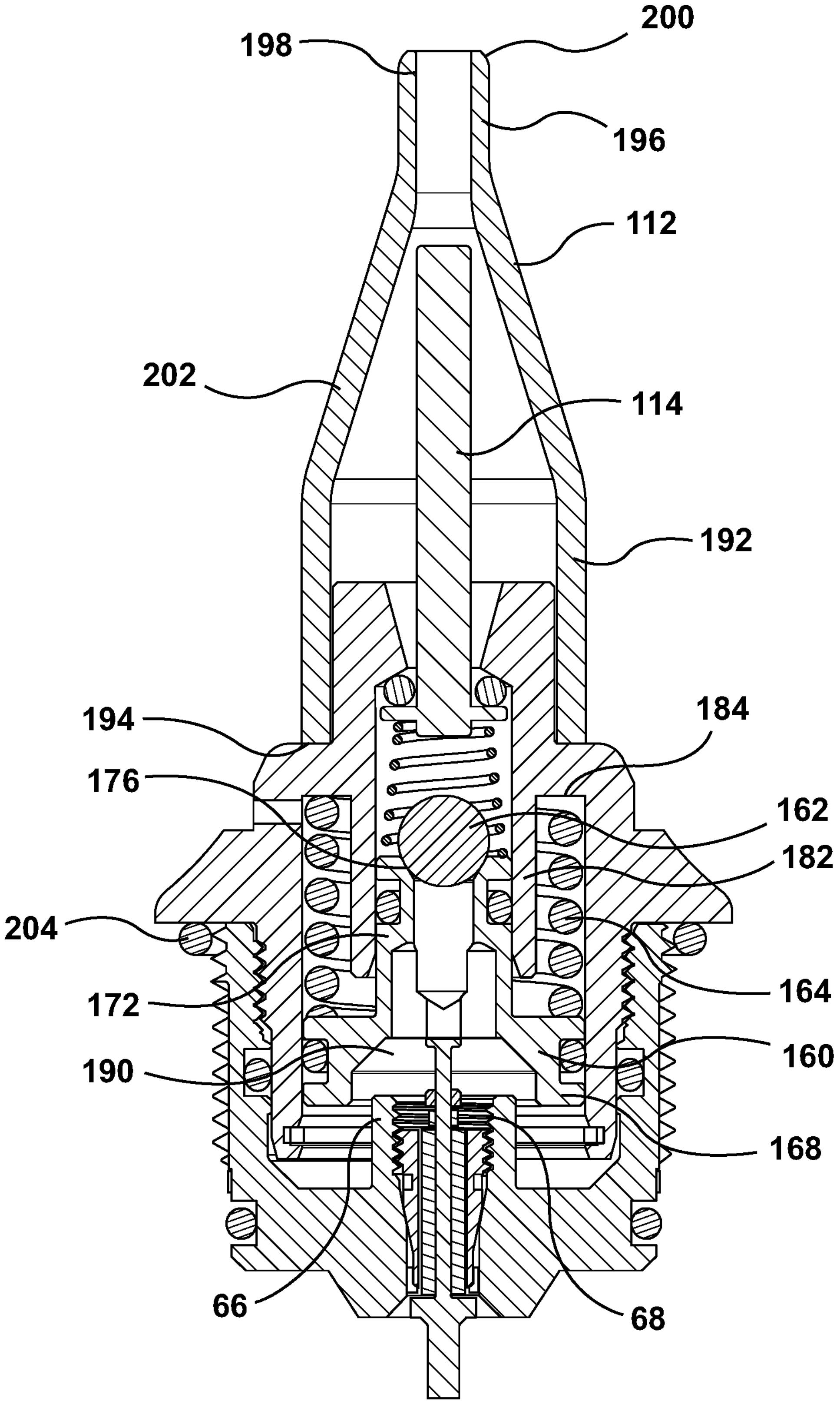
FIG. 7 is a cross-sectional view of the nozzle assembly.
Figure 8:
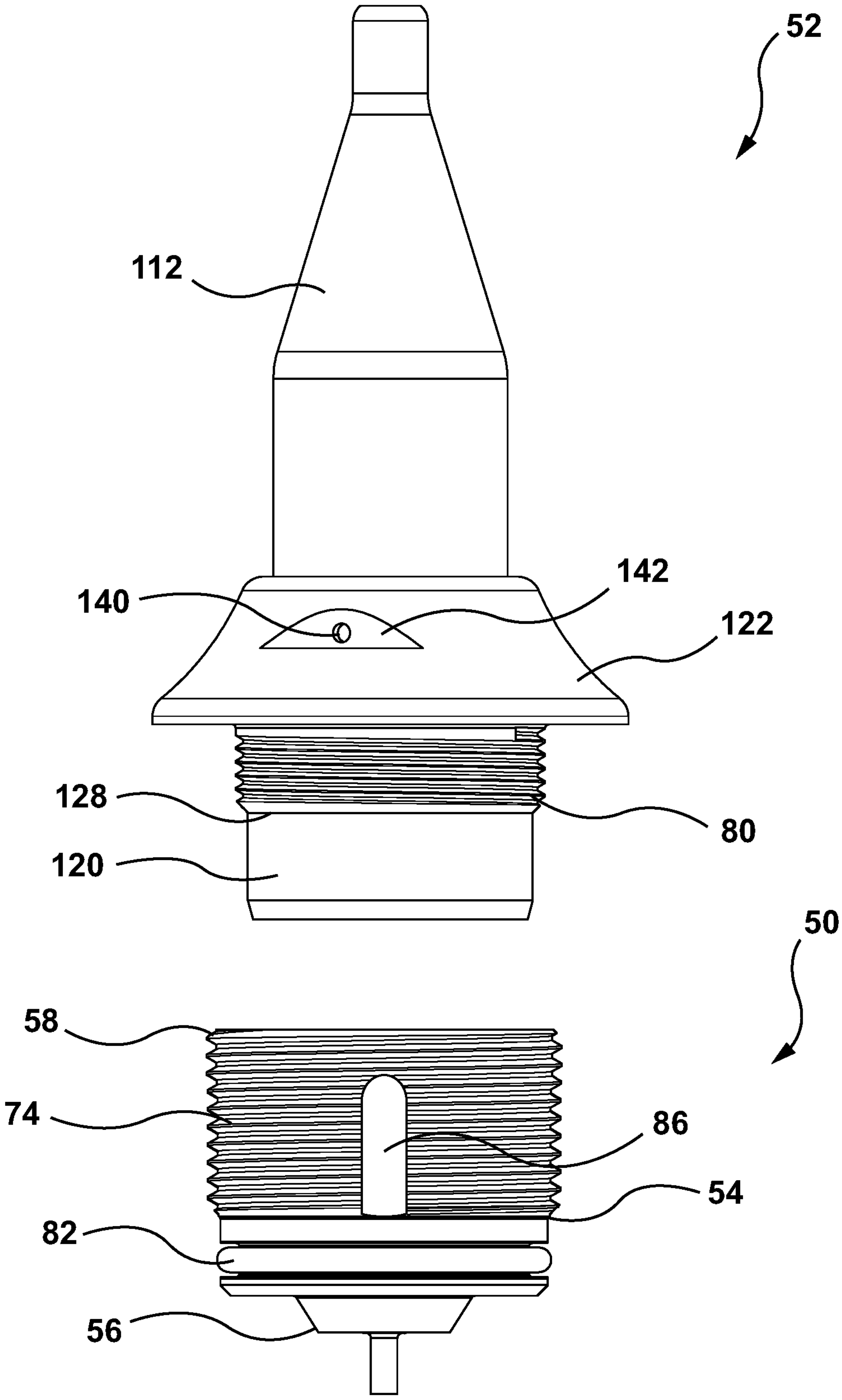
FIG. 8 is an exploded view of a valve assembly and a regulator assembly.
Figure 9:
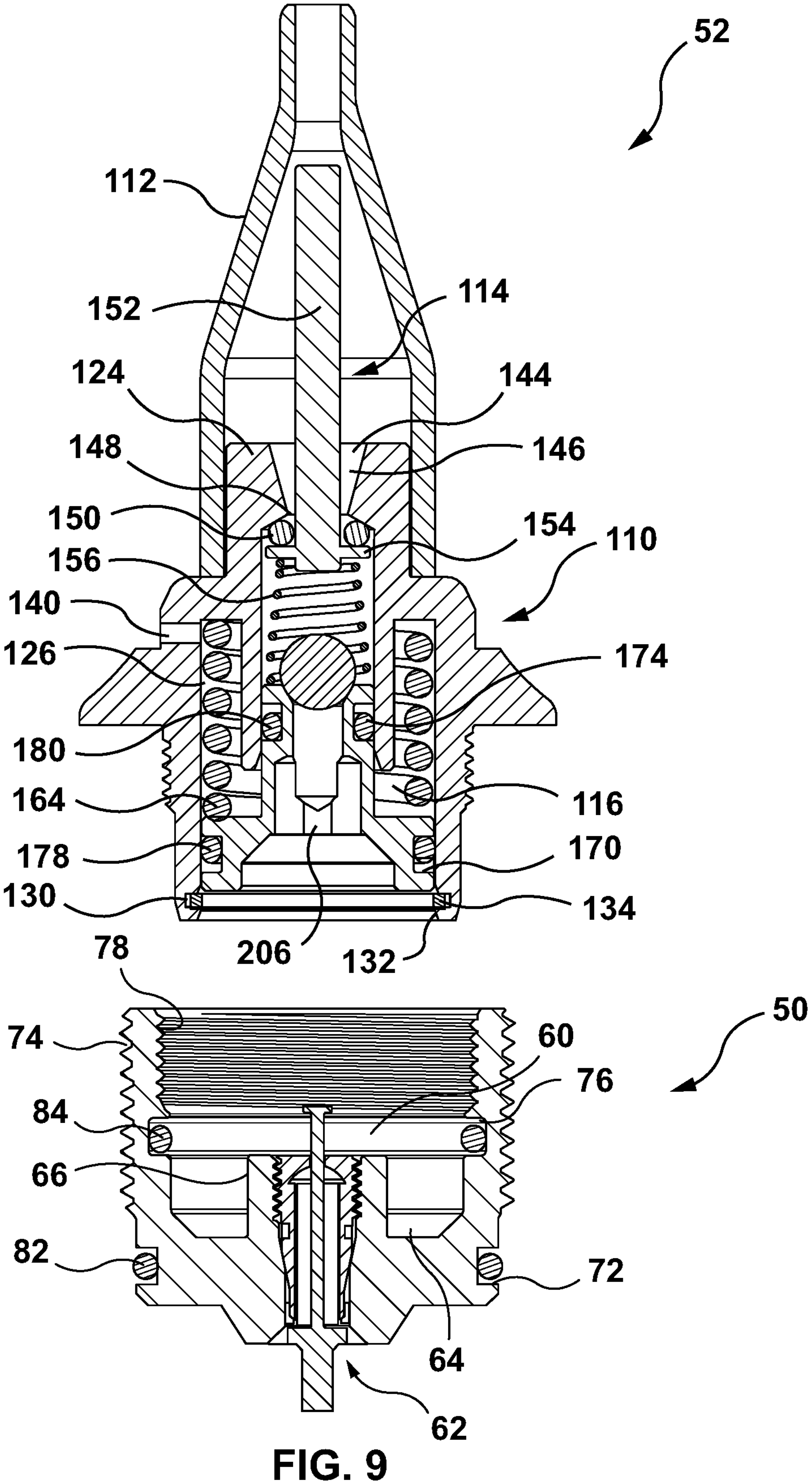
FIG. 9 is a cross-sectional view of the valve assembly and regulator assembly.

Turning additionally to FIG. 5, the cap 16 has a tamper resistant attachment 30 having a plurality of circumferentially spaced radially inwardly extending tabs 32 that are received in the outer locking channel 22 to hold the cap 16 to the tank 12 when first installed to prevent actuation of the nozzle assembly during shipping, while on a shelf, etc. To allow for removal of the cap 16, a removable tab 34 of the attachment 30 is removed also removing the tabs 32 from the channel 22. The cap 16 may also include a secondary attachment having a plurality of circumferentially spaced radially inwardly extending tabs 36 that allows for removable attachment to the nozzle assembly 14 to prevent inadvertent activation. The configuration of the tabs 32 and 36 allows for 360-degree orientation of the cap such that clocking is not needed during assembly.

Referring now to FIGS. 6-9, the nozzle assembly 14 includes a valve assembly 50 configured to be coupled to the tank 12 and a regulator assembly 52 configured to be coupled to the valve assembly 50. The valve assembly 50 includes a valve body 54 having a first end 56, a second end 58, and a passage 60 extending therebetween, and a valve 62 disposed in the passage 60. The passage 60 has a first diameter at the first end 56 for receiving the valve 62, and a second diameter at the second end 58, greater than the first diameter, for receiving the regulator assembly 52. The valve body 54, which may be a suitable material such as aluminum, includes an inner end 64 and a projection 66 projecting from the inner end 64 toward the second end 58 and being radially inwardly spaced from an inner surface of the valve body 54. The first diameter portion of the passage 60 extends from the first end 56 through the inner end 64 and the projection 66, and the second diameter portion extends from the inner end 64 to the second end 58. The projection 66 includes threads 68 along its inner surface for mating with threads 70 of the valve 62.

The valve body 54 also includes a seal groove 72 along an outer surface thereof near the first end 56, threads 74 on the outer surface thereof for mating with the threads 26, a seal groove 76 along an inner surface thereof in the passage 60, and threads 78 on the inner surface for mating with threads 80 on the regulator assembly 52. The seal groove 72 receives a suitable seal, such as O-ring 82 for sealing to the first sealing surface 24 and the seal groove 76 receives a suitable seal, such as O-ring 84 for sealing to the regulator assembly 52 before a piston engages the valve 62 during assembly. The valve body 54 also includes one or more pressure relief channels 86, and as shown two channels 86 on opposed sides of the body 54 extending in a direction from the first end 56 towards the second end 58, from a bottom of the threads 74 to an area above the bottom of the threads. The channels 86 allow for tank depressurization during removal of the nozzle assembly 14 in situations where the nozzle assembly 14 is removed before full depressurization of the tank 12.

Figure 10:
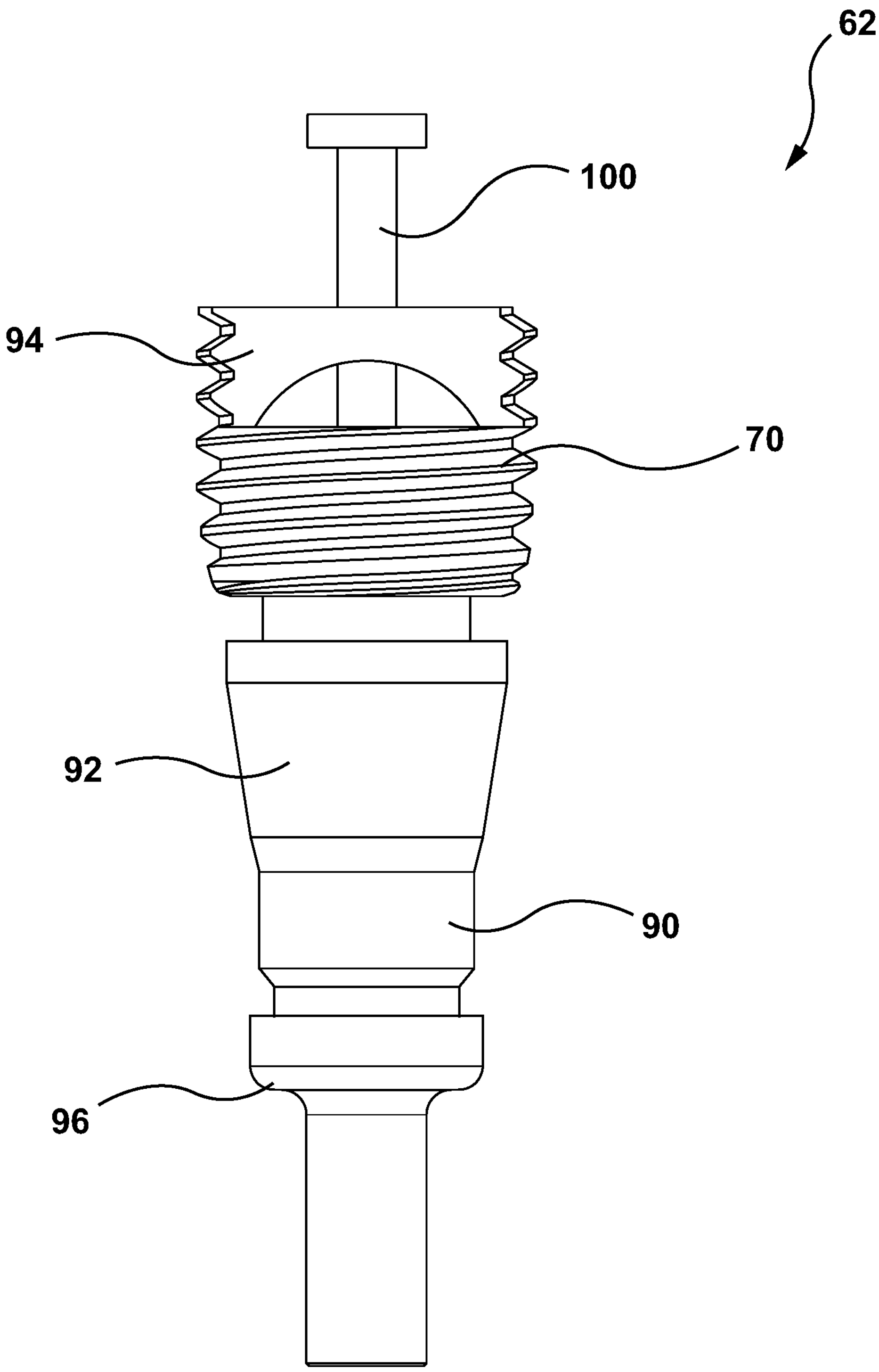
FIG. 10 is a front view of a valve.
Figure 11:
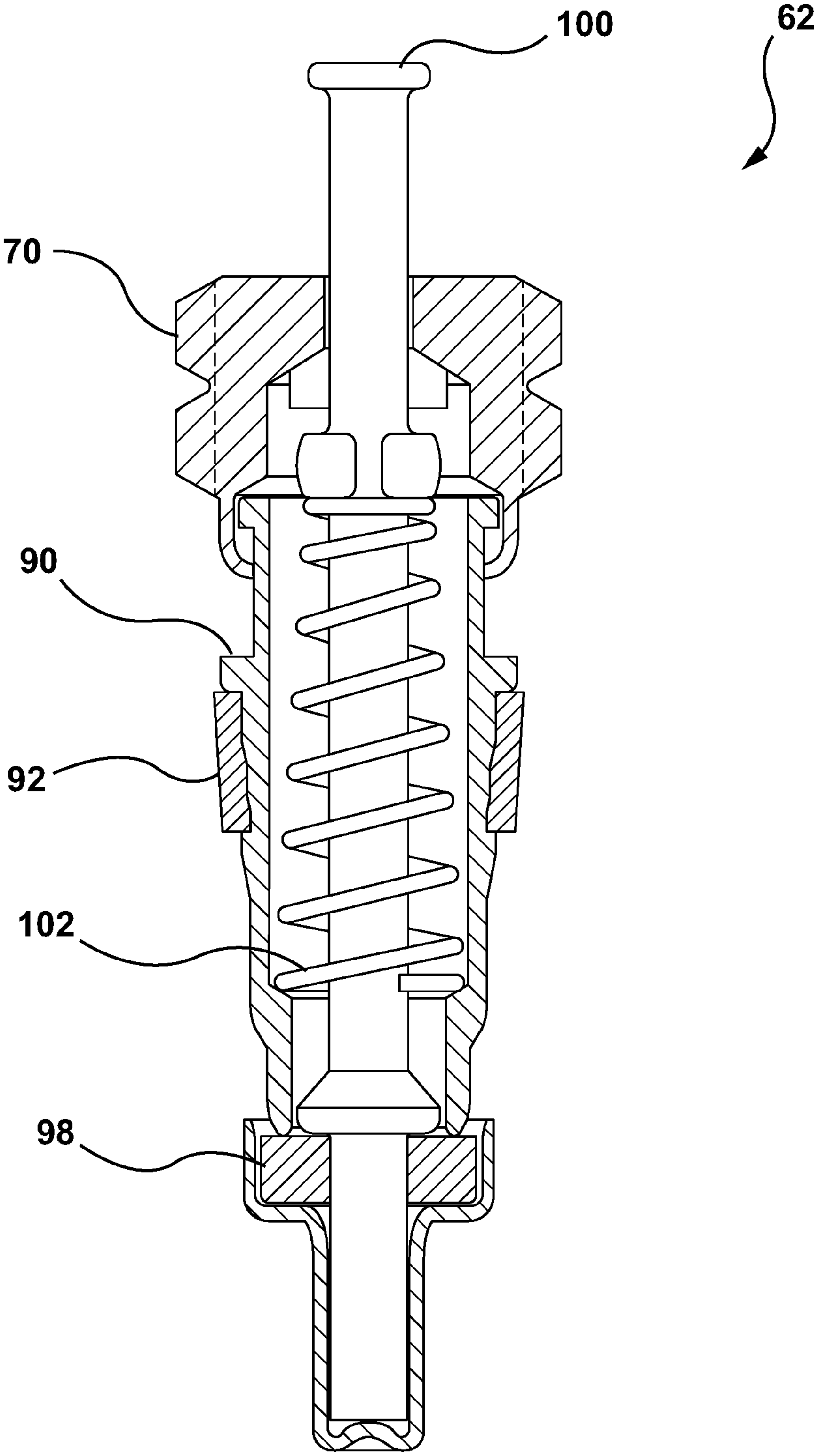
FIG. 11 is a cross-sectional view of the valve.

Turning additionally to FIGS. 10 and 11, the valve 62 is provided to allow/prevent gas flow in and out of the tank and works with the regulator assembly 52 to regulate the output flow rate and operating pressure as discussed below. The valve 62 may include a barrel 90 having a seal 92 on its outer surface for sealing to the passage 60, a head 94 attached to or integrally formed with one end of the barrel 90, a cup 96 at another end of the barrel 90, a seal 98 disposed in the cup 96, and a pin 100 extending through the barrel 90 and head 94 and attached to or integrally formed with and sealed to the cup 96. The pin 100 is biased in a first positon by a resilient member, such as a spring 102, and is movable to a second position to move the cup and seal away from the barrel to allow flow from that tank through the barrel and to the regulator assembly 52.

Turning now to the regulator assembly 52 in detail, the regulator assembly 52 includes a regulator body 110, a sleeve or nozzle 112 coupled to the body 110, a spindle 114 disposed in the regulator body 110 and sleeve 112, and a piston assembly 116 disposed in the body 110. The regulator assembly 52 thereby combines a regulator with a tilt nozzle reducing size and parts of the assembly. The regulator body 110 includes a base portion 120, a flange portion 122, and an upper portion 124. A through passage 126 extends through the base portion 120, the flange portion 122, and the upper portion 124, and includes a first diameter portion, a second diameter portion, and a third diameter portion.

The base portion 120 includes the threads 80 on an outer surface thereof for mating with the threads 78 of the valve body 54, a sealing surface 128 below the threads 80 that seals to the seal 84 in the regulator assembly 52 before the piston assembly 116 engages the valve 62 to prevent gas loss during assembly, and a retainer groove 130 in the through passage 126 near an open end 132 of the base portion 120 that receives a suitable retainer 134, such as a retaining ring, that retains the piston assembly 116 in the passage 126. The base portion 120 defines the first diameter portion of the passage 126.

The flange portion 122, which may have a substantially conical frustum shape, abuts a top of the neck 20 when attached to the tank 12 and includes a vent passage 140 in communication with the passage 126 to vent to the outer surface of the flange portion 122, and one or more flats 142, such as a pair of flats on opposite sides of the flange portion 122. The flange portion 122 defines the second diameter portion of the passage 126 along with a portion of the upper portion 124. The flats 142 are configured to receive a wrench or other suitable tool to allow removal of the nozzle assembly 14, for example for recycling the tank 12. The wrench flats 142 are designed to fail if a pressure in the tank 12 is above a predetermined threshold. For example, if the pressure in the tank is at the predetermined threshold, such as around 250 psi, a torque required to remove the nozzle assembly 14 would be a first torque, such as around 100 in-lbs. If the pressure is above the predetermined threshold, the flats 142 will deform preventing removal of the nozzle assembly 14 with the tool.

The upper portion 124 includes an open end 144 and a passage portion 146 forming the third diameter portion of the passage 126 connecting to the open end 144. The passage portion 146 may be flared, spreading outward toward the open end 144, and a seat 148 for a suitable seal, such as O-ring 150, may be provided in the passage 126 where the passage 126 angles inward. The spindle 114 includes a spindle rod 152 extending through the passage portion 146 and into the sleeve 112, and a disk 154 having a first side forming a spring seat and a second side abutting the seal 150. The spindle 114 may be held against the seal by a resilient member, such as a spring 156, which is seated against the spring seat and the piston assembly 116. A user can apply force to the spindle 114, causing the spindle rod 152 and the disk 154 to articulate or tilt, from a first position shown in figures to a second position (not shown), dispensing gas from the source of pressurized gas, e.g., the pressure tank 12. It will be appreciated that other flare angles can be used and that the flare angle of the passage portion 146 may function to limit the angular travel of the spindle rod 152 when a force is applied by the user.

Turning now to the piston assembly 116 in detail, the piston assembly 116 includes a piston 160, a valve element 162 configured to contact the piston 160, and a resilient member 164, such as a spring, configured to bias the piston in a first position. The piston 160 includes a head 168 having a seal groove 170, and a body 172 having a diameter smaller than the diameter of the head 168 and having a seal groove 174 and a valve seat 176. The seal groove 170 is configured to receive a suitable seal 178, such as an O-ring, for sealing the head 168 to the inner wall of the base portion 120 defining the first diameter portion of passage 126. The seal groove 174 is similarly configured to receive a suitable seal 180, such as an O-ring, for sealing the body 172 within a projection 182 defining the second diameter portion of the passage 126 and projecting from an inner end 184 of the flange portion 122 toward the open end 132 of the base portion 120. If there is leakage between the seal 178 and the inner wall of the base portion 120, the fluid can vent out of the vent passage 140 to prevent a fluid buildup behind the head 168 and prevent an opposing force from pushing on the piston other than the spring 164.

The piston 160 also includes a passage 190 extending through the head 168 and body 172 to allow fluid flow from the tank to the sleeve 112, and the valve element 162 is configured to seat against the valve seat 176 to prevent fluid flow from the sleeve 112 toward the tank 12. The valve element 162 thereby provides a safety feature to prevent refilling of the tank according to standards. The spring 164 has one end seated against a backside of the head 168, and a second end seated against the inner end 184. As shown, a diameter of the spring 156 at the body 172 is larger than the diameter of the valve element 162 to surround the valve element 162 and not prevent movement of the valve element 162 to away from the body 172 during fluid flow from the tank 12.

Turning now to the sleeve 110 in detail, the sleeve may be made of a suitable material such as rubber, and can include a first cylindrical portion 192 at a first end 194 for sealably engaging and/or coupling to the flange portion 122 in a suitable manner, such as with an adhesive, and a second cylindrical portion 196 having an aperture 198 at a second end 200. A tapered portion 202, proximate the second end 200, forms a transition between the first and the second cylindrical portions 192 and 196 respectively, and configures the second end 200 of the sleeve 110 to slidably receive the neck of a balloon for example.

To assemble the tank assembly 10, the valve assembly 50 is coupled to the tank by engaging the threads 64 on the outer surface of the valve body 54 with the threads 26 on the inner surface of the neck 20. The tank 12 is then filled with fluid, such as helium, by connecting a source of fluid to the valve 62. For example, the pin 100 can be moved toward the tank 12 against the biasing force of the spring 102 to an opened position to allow fluid to flow through the valve 62 into the tank 12. By filling the tank through the valve assembly 50, a separate fill valve in not utilized in addition to the nozzle assembly 14. Once the tank has reached a predetermined fill level, for example 1800 psi, the source of fluid can be removed and the valve 62 moves back to a closed position preventing fluid from exiting the tank 12. The regulator assembly 52 can then be attached to the valve assembly 50 by engaging the threads 80 on the base portion 120 with the threads 78 on the valve body 54. In an embodiment, the threads 80 may have a suitable thread adhesive applied thereto to permanently attach the regulator assembly 52 to the valve assembly 50. It will be appreciated that in an embodiment the thread adhesive may be applied to the threads 78 in addition to are as an alternative to the threads 80. A suitable seal 204 is received in the second inner annular ledge 28 and seals the tank 12 to the body 54 and the flange portion 122.

As the regulator assembly 52 is attached to the valve assembly 50, an inner ledge 206 of the piston 160 contacts and depresses the pin 100 thereby opening the valve 62 and allowing the assembly to work like a regulator. Prior to the pin 100 being depressed, the seal 84 in the valve body 54 engages the sealing surface 128 below the threads 80 to seal the regulator assembly 52 to the valve assembly 50 and prevent fluid leakage during assembly. Once the regulator assembly 52 is coupled to the valve assembly 50 and the piston 160 has moved the valve 62 to the opened position, fluid flows from the tank 12 and through the passage 190 in the piston 160, thereby moving the valve element 162 away from the valve seat 172. The fluid pressure in the regulator may then cause the piston 160 to move and close the valve 62 depending on the pressure. The cap 16 can then be attached to the tank 12, with the plurality of circumferentially spaced radially inwardly extending tabs 32 being received in the outer locking channel 22 of the tank 12 to prevent actuation of the nozzle assembly 14.

During operation, the user actuates the regulator assembly 52 by applying a force to the spindle 114, causing the spindle rod 152 and the disk 154 to articulate or tilt to unseat the disk 154 from the seal 150 and allow fluid in the passages 160 and 190 to exit the second end 200 of the sleeve 110 and reduces pressure in the passages. The force of the spring 164 will then push the piston 160 downward to open the valve 62 to allow pressure to reenter the passages 190 and 160 and flow out until the pressure in the passages is reached to close the valve 62.

Traditional cylinders may be recycled by opening the valve, releasing the pressure in the cylinder, removing the nozzle, removing the burst disk to show a hole proving depressurization, and then marking the cylinder empty. In the present assembly, the tank 10 may be recycled by releasing the pressure in the tank via the nozzle 110, engaging a wrench or other suitable tool with the flats 142 of the nozzle assembly 14, and then removing the nozzle assembly 14 by unthreading the threads 74 from the threads 26. The present assembly thereby provides for a reduced number of steps.

Figure 12:
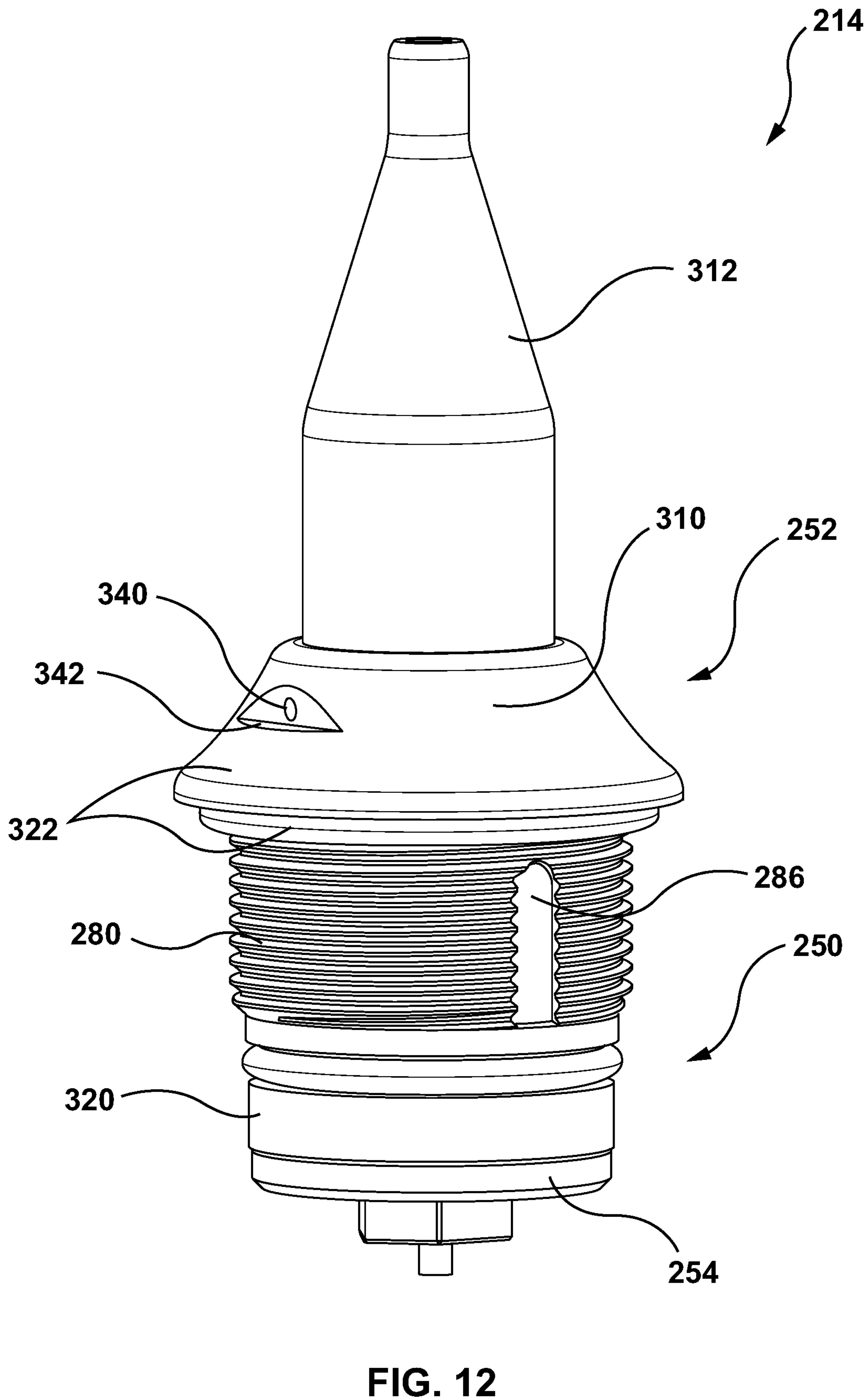
FIG. 12 is a perspective view of another exemplary nozzle assembly.
Figure 13:
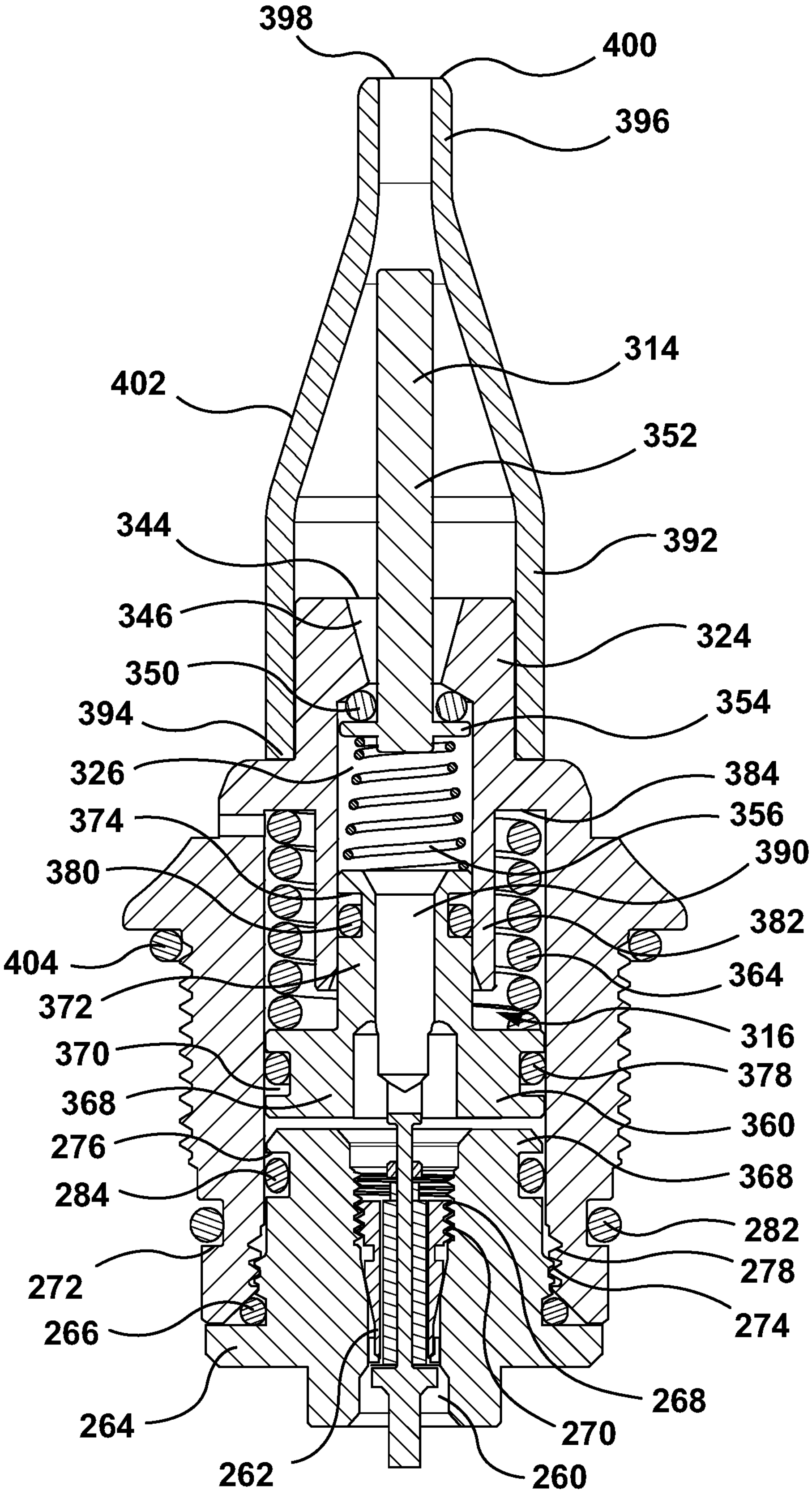
FIG. 13 is a cross-sectional view of the nozzle assembly.
Figure 14:
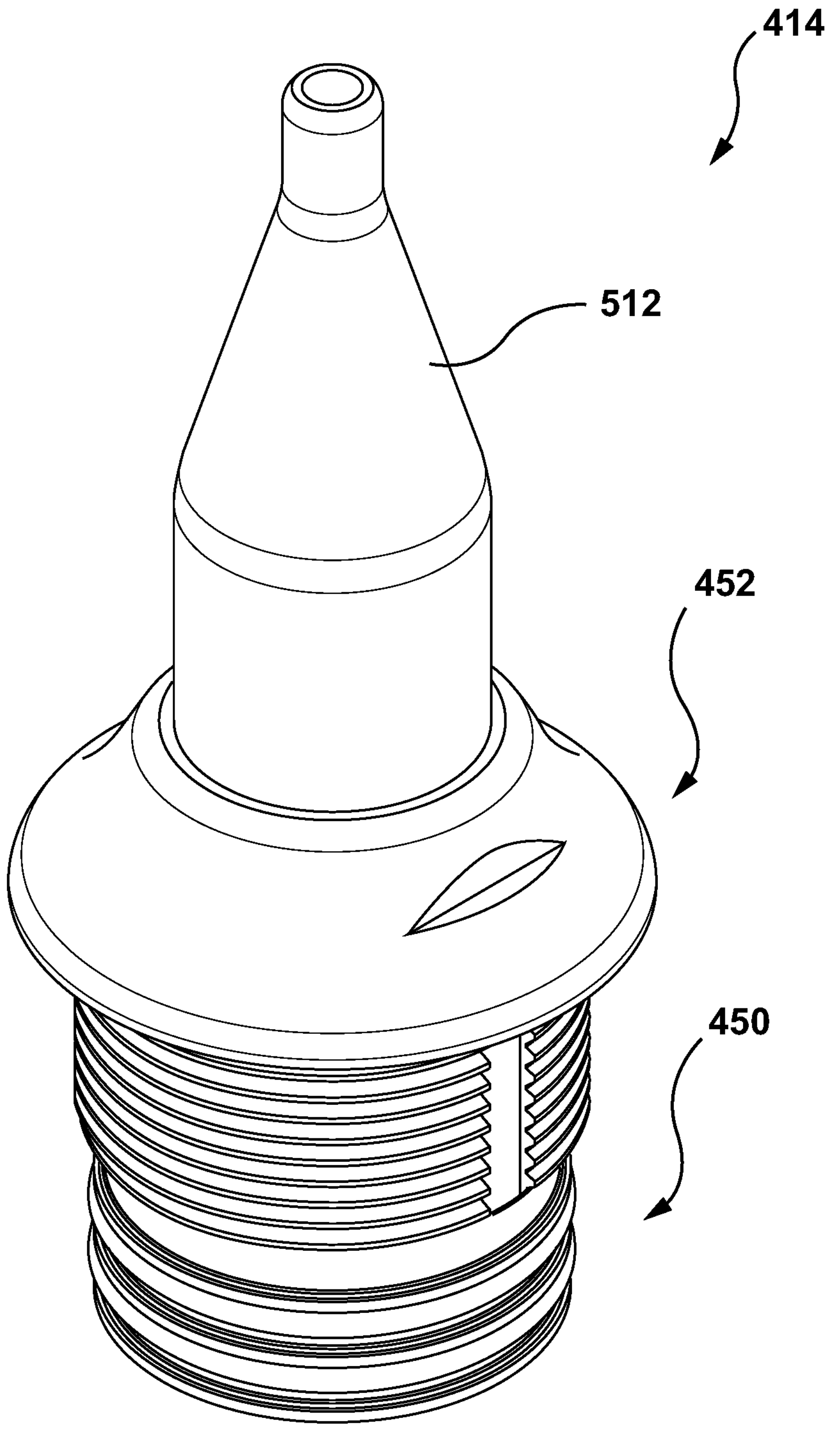
FIG. 14 is a perspective view of still another exemplary nozzle assembly.
Figure 15:
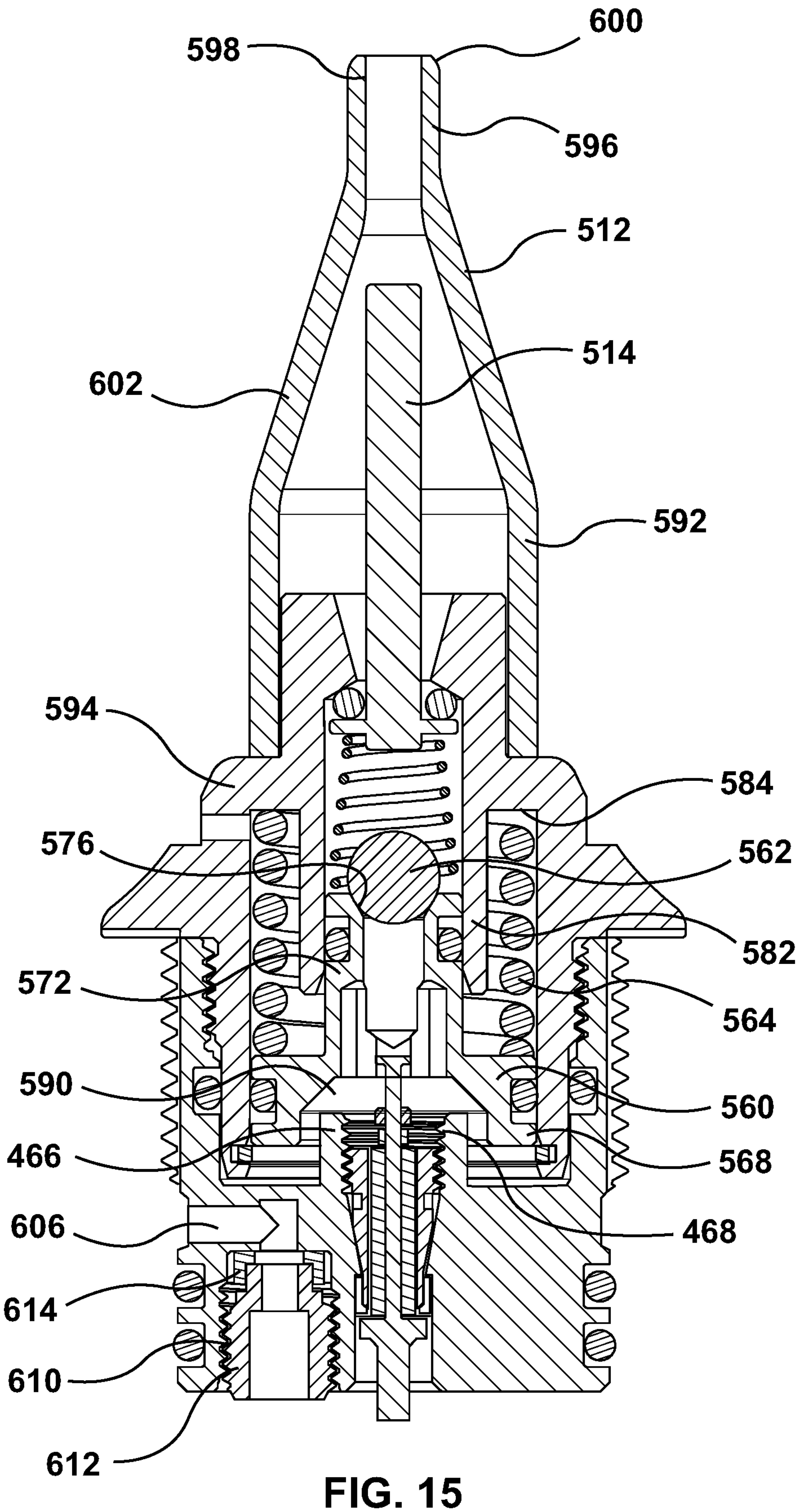
FIG. 15 is a cross-sectional view of the nozzle assembly.
Figure 16:
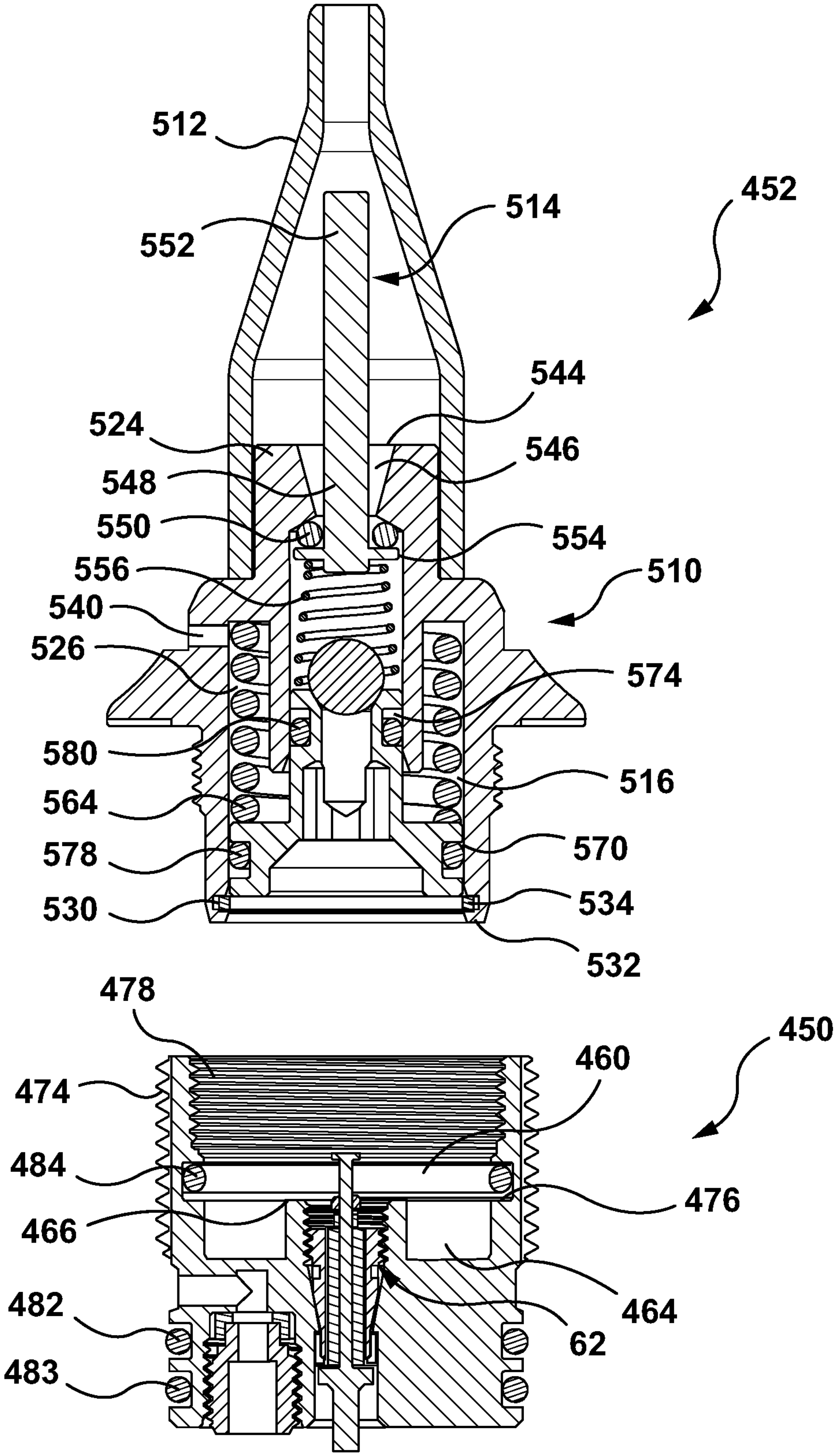
FIG. 16 is a cross-sectional view of the valve assembly and regulator assembly.
Figure 17:
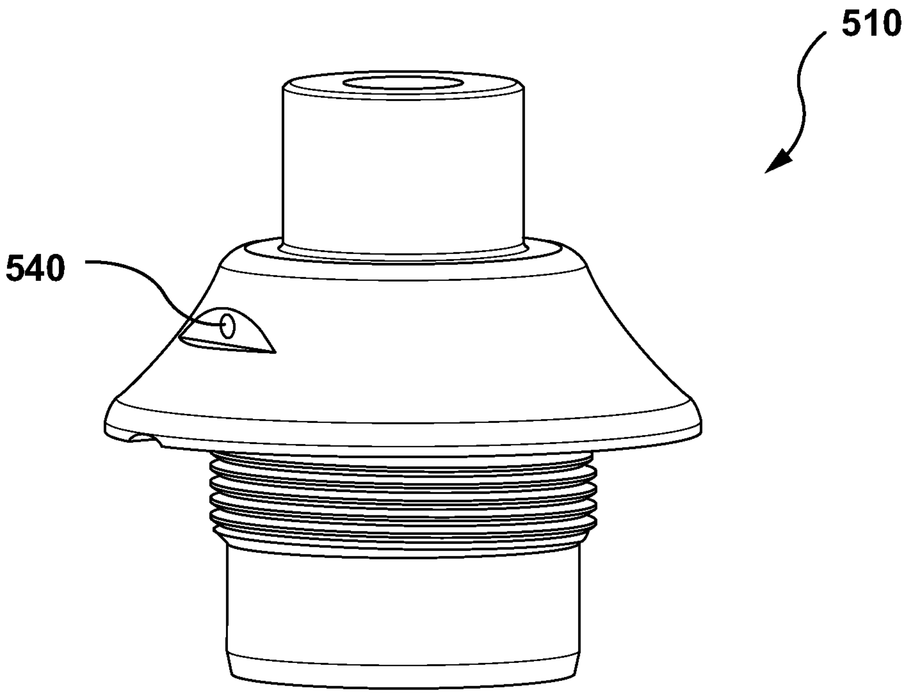
FIG. 17 is a perspective view of a regulator body.
Figure 18:
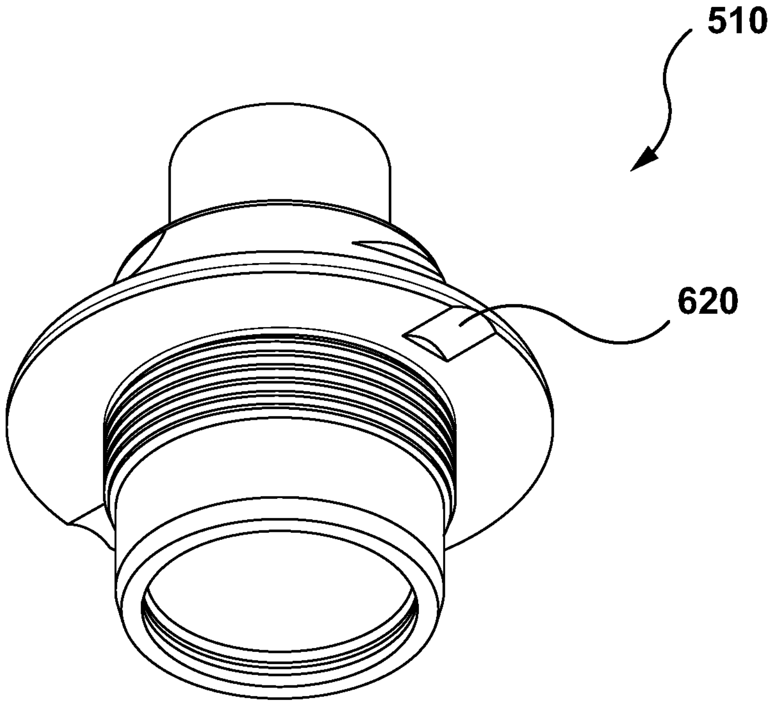
FIG. 18 is another perspective view of the regulator body.
Figure 19:
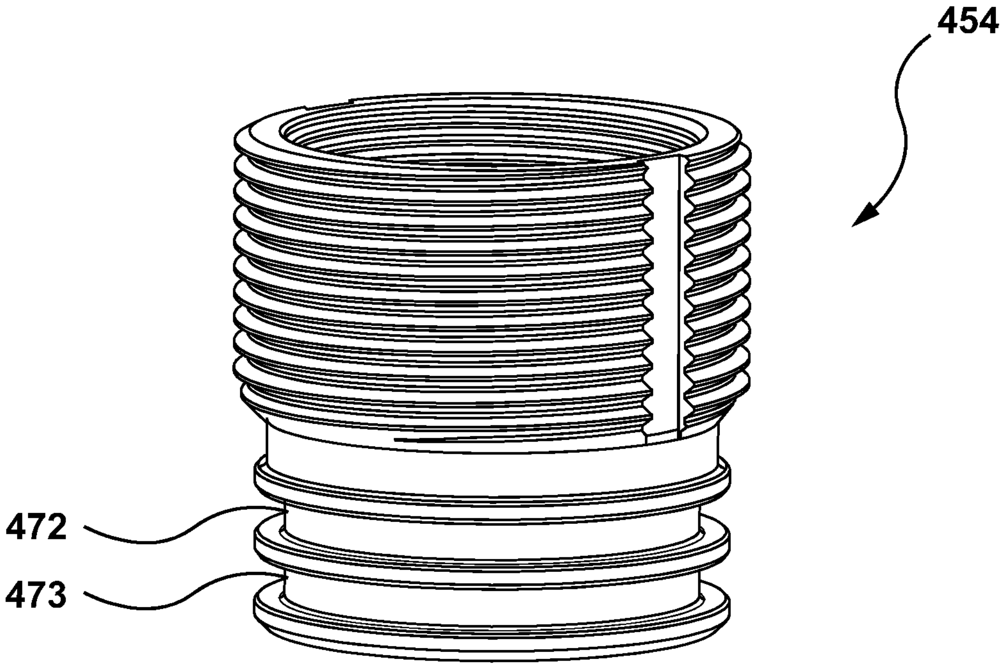
FIG. 19 is a perspective view of a valve body.
Figure 20:
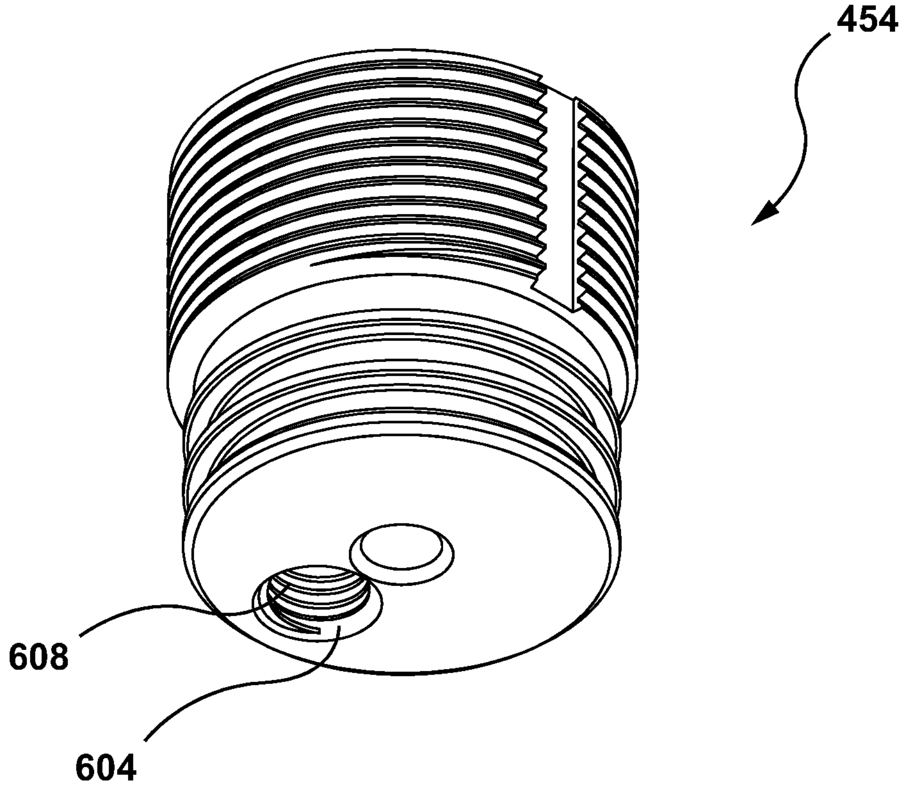
FIG. 20 is another perspective view of the valve body.

Turning now to FIGS. 12 and 13, an exemplary embodiment of the nozzle assembly is shown at 214. nozzle assembly 214 is substantially the same as the above-referenced nozzle assembly 14, and consequently the same reference numerals but indexed by 200 are used to denote structures corresponding to similar structures in the nozzle assemblies. In addition, the foregoing description of the nozzle assembly 14 is equally applicable to the nozzle assembly 214 except as noted below.

The nozzle assembly 214 includes a valve assembly 250 configured to be coupled to the tank 12 and a regulator assembly 252 configured to be coupled to the valve assembly 250. The valve assembly 250 includes a valve body 254 having a passage 260 extending therethrough and a valve 262 disposed in the passage 260. The valve body 254 includes a flanged portion 264 defining a seat for a seal 266, and threads 268 along an inner surface of the body 254 forming the passage 260 for mating with threads 270 of the valve 262. The valve body 254 also includes a seal groove 276 along an outer surface thereof and threads 274 on the outer surface thereof for mating with threads 278 on the regulator assembly 252. The seal groove 276 receives a suitable seal, such as O-ring 284 for sealing to the regulator assembly 252.

Turning now to the regulator assembly 252 in detail, the regulator assembly 252 includes a regulator body 310, a sleeve or nozzle 312 coupled to the body 310, a spindle 314 disposed in the regulator body 310 and sleeve 312, and a piston assembly 316 disposed in the body 110. The regulator assembly 252 thereby combines a regulator with a tilt nozzle reducing size and parts of the assembly. The regulator body 310 includes a base portion 320, a flange portion 322, and an upper portion 324. A through passage 326 extends through the base portion 320, the flange portion 322, and the upper portion 324, and includes a first diameter portion, a second diameter portion, and a third diameter portion.

The base portion 320 includes threads 280 on an outer surface thereof for mating with the threads 26 of the tank 12, the threads 278 on an inner surface thereof for mating with the threads 274, a seal groove 272 on the outer surface thereof for receiving a seal 282, such as an O-ring for sealing to the sealing surface 24, and one or more pressure relief channels 286. As shown, the base portion 320 includes two channels 286 on opposed sides of the base portion 320 extending in a vertical direction from a bottom of the threads 280 to an area above the bottom of the threads. The channels 286 allow for tank depressurization during removal of the nozzle assembly 214 in situations where the nozzle assembly 214 is removed before full depressurization of the tank 212.

The flange portion 322 abuts a top of the neck 20 when attached to the tank 12 and includes a vent passage 340 in communication with the passage 326 to vent to the outer surface of the flange portion 322, and one or more flats 342, such as a pair of flats on opposite sides of the flange portion 122. The flange portion 322 defines the second diameter portion of the passage 326 along with a portion of the upper portion 324.

The upper portion 324 includes an open end 344 and a passage portion 346 forming the third diameter portion of the passage 326 connecting to the open end 344. The passage portion 346 may be flared, spreading outward toward the open end 344, and a seat for a suitable seal, such as O-ring 350, may be provided in the passage 326 where the passage 326 angles inward. The spindle 314 includes a spindle rod 352 extending through the passage portion 346 and into the sleeve 312, and a disk 354 having a first side forming a spring seat and a second side abutting the seal 350. The spindle 314 may be held against the seal by a resilient member, such as a spring 356, which is seated against the spring seat and the piston assembly 316.

Turning now to the piston assembly 316 in detail, the piston assembly 316 includes a piston 360 and a resilient member 364, such as a spring, configured to bias the piston in a first position. The piston 360 includes a head 368 having a seal groove 370, and a body 372 having a diameter smaller than the diameter of the head 368 and having a seal groove 374. The seal groove 370 is configured to receive a suitable seal 378, such as an O-ring, for sealing the head 368 to the inner wall of the base portion 320 defining the first diameter portion of passage 326. The seal groove 374 is similarly configured to receive a suitable seal 380, such as an O-ring, for sealing the body 372 within a projection 382 defining the second diameter portion of the passage 326 and projecting from an inner end 384 of the flange portion 322. The piston 360 also includes a passage 390 extending through the head 368 and body 372 to allow fluid flow from the tank to the sleeve 312.

Turning now to the sleeve 310 in detail, the sleeve may be made of a suitable material such as rubber, and can include a first cylindrical portion 392 at a first end 394 for sealably engaging and/or coupling to the flange portion 322 in a suitable manner, such as with an adhesive, and a second cylindrical portion 396 having an aperture 398 at a second end 400. A tapered portion 402, proximate the second end 400, forms a transition between the first and the second cylindrical portions 392 and 396 respectively, and configures the second end 400 of the sleeve 310 to slidably receive the neck of a balloon for example.

To assemble, the valve assembly 250 is coupled to the regulatory assembly 252 by engaging the threads 274 of the valve body 254 with the threads 278 of the base portion 320, thereby sealing the seals 282 and 266 to the regulator assembly 252. The nozzle assembly 214 is then coupled to the tank by engaging the threads 280 with the threads 26 of the tank 12. A suitable seal 404 is provided to seal the tank 212 to the body 254 and the flange portion 322. The tank 12 is then filled with fluid, such as helium, by connecting a source of fluid to the sleeve 312. The tank 12 can subsequently be refilled in this manner when utilizing the nozzle assembly 214.

Turning now to FIGS. 14-20, an exemplary embodiment of the nozzle assembly is shown at 414. nozzle assembly 414 is substantially the same as the above-referenced nozzle assembly 14, and consequently the same reference numerals but indexed by 400 are used to denote structures corresponding to similar structures in the nozzle assemblies. In addition, the foregoing description of the nozzle assembly 14 is equally applicable to the nozzle assembly 414 except as noted below.

The nozzle assembly 414 includes a valve assembly 450 configured to be coupled to the tank 12 and a regulator assembly 452 configured to be coupled to the valve assembly 450. The valve assembly 450 includes a valve body 454 having a first end 456, a second end 458, and a passage 460 extending therebetween, and a valve 462 disposed in the passage 460. The passage 460 has a first diameter at the first end 456 for receiving the valve 462, and a second diameter at the second end 458, greater than the first diameter, for receiving the regulator assembly 452. The valve body 454 includes an inner end 464 and a projection 466 projecting from the inner end 464 toward the second end 458 and being radially inwardly spaced from an inner surface of the valve body 454. The valve body 454 also has an opening 604 at the first end 456 that opens to a passage 606 substantially perpendicular thereto that opens to a side of the valve body 454. The passages includes threads 608 on an inner surface thereof for mating with threads 610 on a pressure relieve device 612 received in the opening 604. The pressure relief device 612 may be sized smaller than other pressure relief devices, such as a diameter of approximately one quarter of an inch. Between the pressure relief device 612 and an end of the opening 604 is a membrane 614 that may be made of a suitable material such as copper or aluminum.

The valve body 454 also includes a first and second groove 472 and 473 along an outer surface thereof near the first end 456 longitudinally spaced from one another, threads 474 on the outer surface thereof for mating with the threads 426, a seal groove 476 along an inner surface thereof in the passage 460, and threads 478 on the inner surface for mating with threads 480 on the regulator assembly 452. The seal grooves 472 and 473 each receive a suitable seal, such as O-ring 482 and 483 respectively for sealing to the first sealing surface 424, and the seal groove 476 receives a suitable seal, such as O-ring 484 for sealing to the regulator assembly 452 before a piston engages the valve 462 during assembly. The valve body 454 also includes one or more pressure relief channels 486, and as shown two channels 486 on opposed sides of the body 54 extending in a direction from the first end 456 towards the second end 458, from a bottom of the threads 474 to an area above the bottom of the threads. The passage 606 opens to the side of the valve body 454 below one of the channels 486 and above the seals 482 and 483 to allow for pressure relief from the tank.

Turning now to the regulator assembly 452 in detail, the regulator assembly 452 includes a regulator body 510, a sleeve or nozzle 512 coupled to the body 510, a spindle 514 disposed in the regulator body 510 and sleeve 512, and a piston assembly 516 disposed in the body 510. The regulator body 510 includes a base portion 520, a flange portion 522, and an upper portion 524. A through passage 526 extends through the base portion 520, the flange portion 522, and the upper portion 524, and includes a first diameter portion, a second diameter portion, and a third diameter portion.

The base portion 520 includes the threads 480 on an outer surface thereof for mating with the threads 478 of the valve body 454, a sealing surface 528 below the threads 480 that seals to the seal 484 in the regulator assembly 452 before the piston assembly 516 engages the valve 462 to prevent gas loss during assembly, and a retainer groove 530 in the through passage 526 near an open end 532 of the base portion 520 that receives a suitable retainer 534, such as a retaining ring, that retains the piston assembly 516 in the passage 526. The base portion 520 defines the first diameter portion of the passage 126.

The flange portion 522 abuts a top of the neck 20 when attached to the tank 12 and includes a vent passage 540 in communication with the passage 526 to vent to the outer surface of the flange portion 522, and one or more flats 542, such as a pair of flats on opposite sides of the flange portion 522. The flange portion 522 defines the second diameter portion of the passage 526 along with a portion of the upper portion 524. The flats 542 are configured to receive a wrench or other suitable tool to allow removal of the nozzle assembly 14. The flange portion 522 also includes one or more undercuts 620 on an underside thereof, and as shown a pair of undercuts that align with the channels 486 to allow for venting from the channels 486

The upper portion 524 includes an open end 544 and a passage portion 546 forming the third diameter portion of the passage 526 connecting to the open end 544. The passage portion 546 may be flared, spreading outward toward the open end 544, and a seat 548 for a suitable seal, such as O-ring 550, may be provided in the passage 526 where the passage 526 angles inward. The spindle 514 includes a spindle rod 552 extending through the passage portion 546 and into the sleeve 512, and a disk 554 having a first side forming a spring seat and a second side abutting the seal 550. The spindle 514 may be held against the seal by a resilient member, such as a spring 556, which is seated against the spring seat and the piston assembly 516.

Turning now to the piston assembly 516 in detail, the piston assembly 516 includes a piston 560, a valve element 562 configured to contact the piston 560, and a resilient member 564, such as a spring, configured to bias the piston in a first position. The piston 560 includes a head 568 having a seal groove 570, and a body 572 having a diameter smaller than the diameter of the head 568 and having a seal groove 574 and a valve seat 576. The seal groove 570 is configured to receive a suitable seal 578, such as an O-ring, for sealing the head 568 to the inner wall of the base portion 520 defining the first diameter portion of passage 526. The seal groove 574 is similarly configured to receive a suitable seal 580, such as an O-ring.

The piston 560 also includes a passage 590 extending through the head 568 and body 572 to allow fluid flow from the tank to the sleeve 512, and the valve element 562 is configured to seat against the valve seat 576 to prevent fluid flow from the sleeve 512 toward the tank 12. The valve element 562 thereby provides a safety feature to prevent refilling of the tank according to standards. The spring 564 has one end seated against a backside of the head 568, and a second end seated against the inner end 584.

Turning now to the sleeve 510 in detail, the sleeve may be made of a suitable material such as rubber, and can include a first cylindrical portion 592 at a first end 594 for sealably engaging and/or coupling to the flange portion 522 in a suitable manner, such as with an adhesive, and a second cylindrical portion 596 having an aperture 598 at a second end 600. A tapered portion 602, proximate the second end 600, forms a transition between the first and the second cylindrical portions 592 and 596 respectively, and configures the second end 600 of the sleeve 510 to slidably receive the neck of a balloon for example.

The aforementioned systems, components, (e.g., valves, cylinders, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A nozzle assembly comprising:

a valve assembly configured to be coupled to a tank, the valve assembly including a valve body having a first end, a second end, and a first passage extending therebetween, and a valve disposed in the first passage, the valve including a pin and a first biasing member that biases the pin in a closed position; and a regulator assembly configured to be coupled to the valve assembly, the regulator assembly including a regulator body having a first end, a second end, and a second passage extending therebetween, a nozzle coupled to the regulator body and having an outlet in communication with the second passage, a spindle having a first end disposed in the second passage and a second end surrounded by the nozzle, and a piston assembly disposed in the second passage, the piston assembly including a piston biased in a first position to contact the pin thereby moving the pin to an open position to open the valve, and movable to a second position away from the valve such that the pin moves to a closed position closing the valve.

2. The nozzle assembly according to claim 1, wherein the valve includes a barrel configured to be sealed to the first passage, a head attached to or integrally formed with a first end of the barrel, and a cup integrally formed with and sealed to the pin, the pin extending through the barrel and head where the cup is away from the barrel when the pin is in the open position.

3. The nozzle assembly according to claim 1, wherein the valve body includes threads on an outer surface thereof for mating with threads on an inner surface of a neck of the tank, and threads on an inner surface thereof in the first passage for mating with threads on an outer surface of the regulator body.

4. The nozzle assembly according to claim 3, wherein the threads on the inner surface of the valve body are non-removably coupled to the threads on the outer surface of the regulator body via an adhesive.

5. The nozzle assembly according to claim 1, wherein the valve body includes at least one seal groove along an outer surface thereof near the first end that receives a seal.

6. The nozzle assembly according to claim 3, wherein the valve body includes one or more pressure relief channels extending in a direction from the first end toward the second end, from a bottom of the threads on the outer surface of the valve body to an area above the bottom of the threads.

7. The nozzle assembly according to claim 5, wherein the valve body includes an opening at the first end in communication with a passage that opens to a side of the valve body between the at least one seal groove and threads on the outer surface of the valve body.

8. The nozzle assembly according to claim 7, further including a pressure relieve device received in the opening.

9. The nozzle assembly according to claim 1, wherein the piston assembly includes a valve element biased against the piston to prevent flow in a direction from the nozzle toward the tank.

10. The nozzle assembly according to claim 1, wherein the regulator body includes a vent passage opening to a side of the regulator body and being in communication with the second passage.

11. The nozzle assembly according to claim 1, wherein the regulator body includes one or more flats for receiving a tool for removing the nozzle assembly from the tank, and wherein the one or more flats are configured to fail if a pressure in the tank is above a predetermined threshold.

12. A nozzle assembly comprising:

a valve assembly configured to be coupled to a tank, the valve assembly including a valve body having a first end, a second end, and a first passage extending therebetween, and a valve disposed in the first passage; and a regulator assembly configured to be coupled to the valve assembly, the regulator assembly including a regulator body having a first end, a second end, and a second passage extending therebetween, a nozzle coupled to the regulator body and having an outlet in communication with the second passage, a spindle having a first end disposed in the second passage and a second end surrounded by the nozzle, and a piston assembly disposed in the second passage, the piston assembly including a piston and a valve element biased against the piston by a resilient member to prevent flow in a direction from the nozzle toward the tank.

13. The nozzle assembly according to claim 12, wherein the tank includes threads on an inner surface of the neck, and wherein the valve body includes threads on an outer surface thereof for mating with the threads on an inner surface of a neck of the tank and threads on an inner surface thereof in the first passage for mating with threads on an outer surface of the regulator body.

14. The nozzle assembly according to claim 13, wherein the valve body includes first and second seal grooves along an outer surface thereof near the first end that receive a respective seal to seal the valve body to the inner surface of the neck.

15. The nozzle assembly according to claim 12, wherein the neck includes an outer locking channel, and wherein the nozzle assembly additionally includes a cap having a plurality of circumferentially spaced radially inwardly extending tabs that are received in the outer locking channel.

16. The nozzle assembly according to claim 15, wherein the cap includes a secondary attachment having a plurality of circumferentially spaced radially inwardly extending tabs that allows for removable attachment of the cap to the nozzle assembly.

17. The nozzle assembly according to claim 14, wherein the valve body includes one or more pressure relief channels extending in a direction from the first end toward the second end, from a bottom of the threads on the outer surface of the valve body to an area above the bottom of the threads, and an opening at the first end in communication with a passage that opens to a side of the valve body between the first and second seal grooves and the threads on the outer surface of the valve body.

18. The nozzle assembly according to claim 12, wherein the piston is biased in a first position where the piston contacts and opens the valve, and a second position away from the valve thereby closing the valve.

19. The nozzle assembly according to claim 12, wherein the regulator body includes a vent passage opening to a side of the regulator body at an area above a neck of the tank when installed and being in communication with the second passage.

* * * * *